United States Patent
Smith

(10) Patent No.: US 9,542,653 B1
(45) Date of Patent: *Jan. 10, 2017

(54) VEHICLE PREDICTION AND ASSOCIATION TOOL BASED ON LICENSE PLATE RECOGNITION

(71) Applicant: VaaS, Inc., Fort Worth, TX (US)

(72) Inventor: Shawn B. Smith, Portola Valley, CA (US)

(73) Assignee: VaaS, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,253

(22) Filed: May 11, 2015

Related U.S. Application Data

(63) Continuation of application No. 13/543,327, filed on Jul. 6, 2012, now Pat. No. 9,031,948.

(60) Provisional application No. 61/505,033, filed on Jul. 6, 2011.

(51) Int. Cl.
  *G06F 17/30* (2006.01)
  *G06N 7/00* (2006.01)

(52) U.S. Cl.
  CPC ......... *G06N 7/005* (2013.01); *G06F 17/30241* (2013.01)

(58) Field of Classification Search
  CPC .. G06F 17/32; G06F 17/3223; G06F 17/3293; G06F 17/3237; G06F 17/3267; G06F 17/16; G06F 17/26; G06F 17/3218; G06F 17/323; G06F 17/3232; G06F 17/3241; G06F 17/3276
  See application file for complete search history.

(56) References Cited

U.S. PATENT DOCUMENTS

| | | | |
|---|---|---|---|
| 4,878,248 A | 10/1989 | Shyu |
| 5,568,406 A | 10/1996 | Gerber |
| 5,737,710 A | 4/1998 | Anthonyson |
| 5,809,161 A | 9/1998 | Auty et al. |
| 6,081,206 A | 6/2000 | Kielland |
| 6,121,898 A | 9/2000 | Moetteli |
| 6,433,706 B1 | 8/2002 | Anderson, III et al. |
| 6,747,687 B1 | 6/2004 | Alves |
| RE38,626 E | 10/2004 | Kielland |
| 6,993,158 B2 | 1/2006 | Cho |
| 7,046,169 B2 | 5/2006 | Bucholz et al. |
| 7,187,783 B2 | 3/2007 | Moon |

(Continued)

*Primary Examiner* — Angelica Ruiz
(74) *Attorney, Agent, or Firm* — Spano Law Group; Joseph S. Spano

(57) ABSTRACT

LPR instances around physical locations and license plate numbers associated with a person of interest are analyzed to predict the relative likelihood of locating the person of interest at a particular location. An LPR information query includes an indication of a physical location and a license plate number associated with a person of interest. The relative likelihood of locating a person of interest at a particular location at a future point in time is determined based on the LPR instances received. In one example, the relative likelihood of locating the person of interest is based on the relative value of clusters of LPR instances around physical locations associated with the person of interest. Additional license plate numbers are associated with a person of interest based on their appearance within a search zone and time window of LPR instances of a license plate number already associated with a person of interest.

18 Claims, 10 Drawing Sheets

(56) References Cited

U.S. PATENT DOCUMENTS

| | | |
|---|---|---|
| 7,277,891 B2 | 10/2007 | Howard et al. |
| 7,579,965 B2 | 8/2009 | Bucholz |
| 7,821,423 B2 | 10/2010 | Lee |
| 8,185,959 B2 | 5/2012 | Bellwood |
| 8,457,354 B1 | 6/2013 | Kolar et al. |
| 2002/0161657 A1* | 10/2002 | Kojac ............... G06F 17/30887 705/26.1 |
| 2003/0095688 A1 | 5/2003 | Kirmuss |
| 2003/0115211 A1 | 6/2003 | Chen et al. |
| 2004/0165750 A1 | 8/2004 | Chew |
| 2005/0036659 A1 | 2/2005 | Talmon et al. |
| 2006/0017562 A1 | 1/2006 | Bachelder |
| 2006/0147087 A1 | 7/2006 | Goncalves |
| 2007/0019846 A1 | 1/2007 | Bullitt |
| 2007/0085704 A1 | 4/2007 | Long |
| 2007/0086621 A1 | 4/2007 | Aggarwal |
| 2007/0208681 A1 | 9/2007 | Bucholz |
| 2007/0258623 A1 | 11/2007 | McGrath |
| 2008/0063280 A1 | 3/2008 | Hofman |
| 2009/0266882 A1* | 10/2009 | Sajkowsky ............ G06K 17/00 235/380 |
| 2009/0285445 A1 | 11/2009 | Vasa |
| 2009/0316951 A1 | 12/2009 | Soderstrom |
| 2010/0150458 A1 | 6/2010 | Angell et al. |
| 2010/0153390 A1 | 6/2010 | Angell et al. |
| 2011/0157369 A1 | 6/2011 | Pederson |
| 2011/0231419 A1 | 9/2011 | Papke |
| 2011/0255740 A1 | 10/2011 | Wu |
| 2011/0261200 A1 | 10/2011 | Kanning |
| 2011/0261202 A1 | 10/2011 | Goldstein |
| 2011/0276394 A1 | 11/2011 | Chan |
| 2012/0017168 A1 | 1/2012 | Mason et al. |
| 2012/0020522 A1 | 1/2012 | Soderstrom |
| 2012/0127077 A1 | 5/2012 | Chen |
| 2012/0155712 A1 | 6/2012 | Paul et al. |
| 2012/0212398 A1 | 8/2012 | Border |
| 2012/0250938 A1 | 10/2012 | DeHart |
| 2012/0258731 A1 | 10/2012 | Smith et al. |
| 2013/0243250 A1 | 9/2013 | France |
| 2013/0307979 A1 | 11/2013 | Chen |
| 2014/0063232 A1 | 3/2014 | Fairfield |
| 2014/0185880 A1 | 7/2014 | Fairfield |

* cited by examiner

VEHICLE PREDICTION AND ASSOCIATION TOOL BASED ON LICENSE PLATE RECOGNITION

CROSS REFERENCE TO RELATED APPLICATION

The present application for patent is a continuation of, and claims priority under 35 U.S.C. §120 from, U.S. patent application Ser. No. 13/543,327, entitled "Vehicle Prediction and Association Tool Based On License Plate Recognition," filed Jul. 6, 2012, which, in turn claims priority under 35 U.S.C. §119 from U.S. provisional patent application Ser. No. 61/505,033, entitled "Vehicle Prediction and Association Tool Based On License Plate Recognition," filed Jul. 6, 2011, the subject matter of which are incorporated herein by reference in their entireties.

TECHNICAL FIELD

The described embodiments relate to license plate recognition systems and tools.

BACKGROUND INFORMATION

License Plate Recognition (LPR) systems are typically employed to scan and log license plate information associated with vehicles parked in publically accessible areas. A typical LPR unit performs image analysis on captured images to identify the license plate number associated with each image. A typical LPR unit generates a record for each license plate number captured. The record may include any of an optical character recognition (OCR) interpretation of the captured license plate image (e.g., output in text string object format), images of the license plate number, a perspective image of the vehicle associated with the license plate number, the date and time of image capture, and the location of the LPR unit at the time of image capture. By continuing to operate each LPR unit for prolonged periods of time over a large area, the amount of aggregated license plate identification information grows. In addition, by combining the information generated by many LPR units, an LPR system may develop a large record of LPR information.

A large record of LPR information is useable for a variety of purposes. In one example, the location of a stolen vehicle may be identified based on a database of LPR information by searching the database for LPR instances that match the license plate number of the stolen vehicle. Based on the time and location information that matches a particular license plate scan corresponding to this license plate number, law enforcement officials may be able to locate the vehicle without costly investigation.

However, it may also be useful to predict the location of a person of interest based on LPR information. Thus, improvements to existing LPR systems are desired.

SUMMARY

LPR instances around physical locations and license plate numbers associated with a person of interest are analyzed to predict the relative likelihood of locating the person of interest at a particular location.

In one aspect, an LPR information query 108 includes an indication of a physical location and a license plate number associated with a person of interest, and in response, an LPR server 101 communicates an LPR information response 109 that includes LPR instances within a search area of the physical location. In addition, the response may indicate whether the license plate number was located around the physical location. The search area may be dynamically sized based on a fixed number of LPR instances, a density of LPR instances, or whether a match with a license plate number associated with the person of interest has been found within the search area.

In another aspect, the relative likelihood of locating a person of interest at a particular location at a future point in time is determined based on LPR instances received from an LPR server. In one example, the relative likelihood of locating the person of interest is based on the relative value of clusters of LPR instances around physical locations associated with the person of interest. The relative value of each cluster of LPR instances is assigned based on attributes of each cluster. In addition, the relative values of clusters are scaled based on attributes of groups of clusters associated with a particular location associated with the person of interest. The relative likelihood of locating a person of interest at a particular location is based on a ranking of the relative values of each of the clusters of LPR instances. A report of this ranking is communicated to a user of an LPR system.

In yet another aspect, license plate numbers are directly associated with a target license plate number associated with a person of interest based on their appearance within a search zone and time window of two different LPR instances of the target license plate.

In yet another aspect, a license plate number is indirectly associated with a target license plate number if the license plate is within a search zone and time window of both an LPR instance of the target license plate number and an LPR instance of a license plate directly associated with the target license plate number. By developing associations between license plate numbers, a larger pool of license plate numbers associated with a person of interest may be developed, and the likelihood of locating a person of interest based on these license plate numbers is improved.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
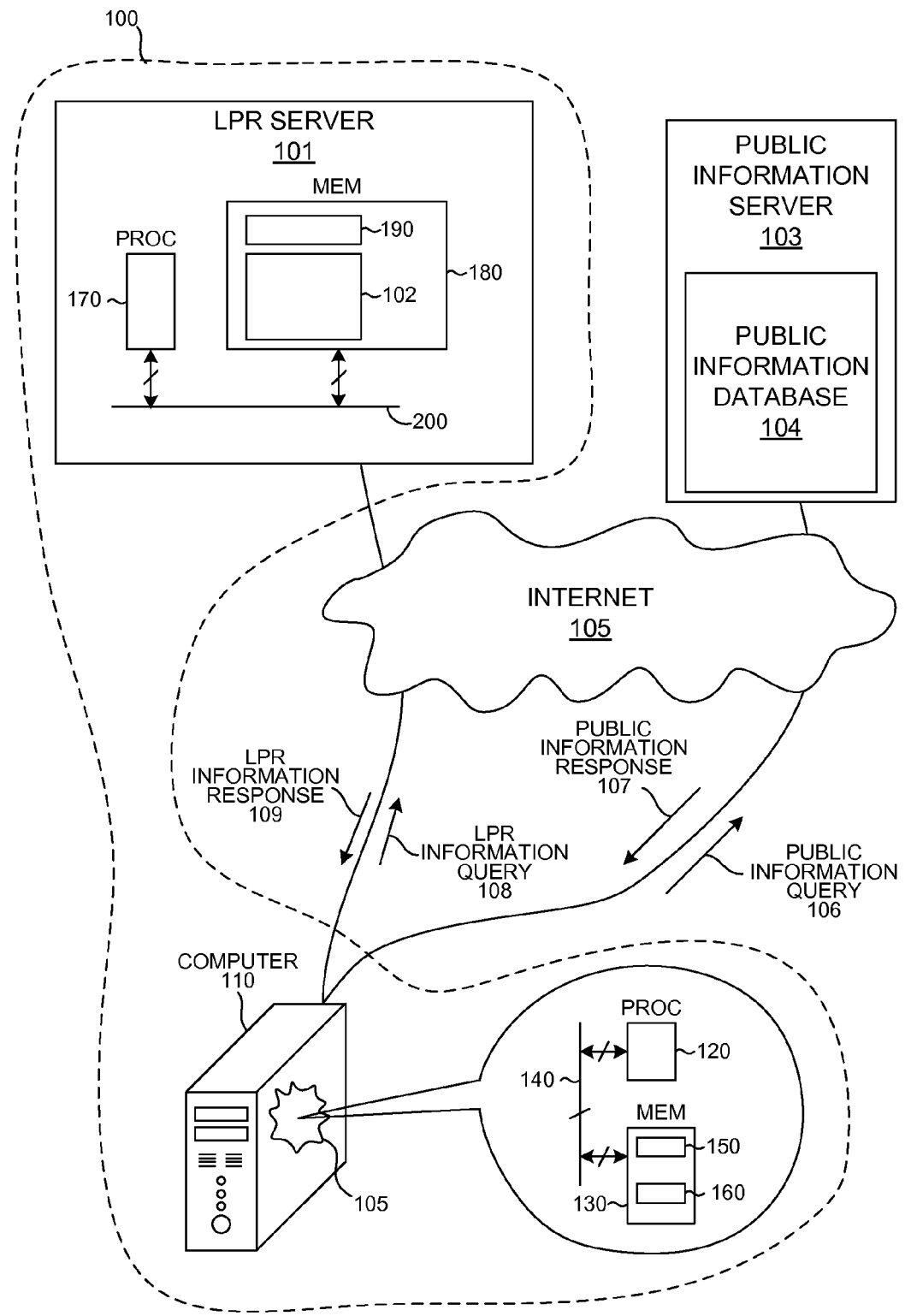
FIG. 1 is a diagram illustrative of a License Plate Recognition (LPR) system 100 in one embodiment.

FIG. 1 is a diagram illustrative of a License Plate Recognition (LPR) system 100 that includes an LPR server 101 that stores a database 102 of LPR instances and a general purpose computer 110 operable to implement vehicle prediction and association based on LPR instances. LPR server 101 includes a processor 170 and an amount of memory 180. Processor 170 and memory 180 may communicate over bus 200. Memory 180 includes an amount of memory 190 that stores a database program executable by processor 170. Exemplary, commercially available database programs include Oracle®, Microsoft SQL Server®, IBM DB2®, etc. Memory 180 also includes an amount of memory that stores an LPR database 102 of LPR instances searchable by the database program executed by processor 170. Computer 110 includes a processor 120 and a memory 130. Processor 120 and memory 130 may communicate over bus 140. Memory 130 includes an amount of memory 150 that stores a number of LPR instances. Memory 130 also includes an amount of memory 160 that stores program code that, when executed by processor 120, causes processor 120 to implement Vehicle Prediction and Association (VPA) functionality by operation of VPA tool 105.

LPR system 100 may include a camera module (not shown) that captures an image of each license plate. In some embodiments, the camera module is attached to a vehicle, or may be a handheld device operated by a person operating a vehicle. The vehicle roves through publically accessible areas capturing license plate images. LPR system 100 may also include a location module (not shown) that determines the physical location and time of each image capture. For example, the LPR system may include a global positioning system (GPS) module that determines the physical location and time of each image capture. In some other embodiments, the camera module is located in a fixed position with a view of passing vehicles (e.g., along a roadside, mounted to a traffic signal, etc.). As vehicles travel by the fixed position, the camera module captures an image of each license plate. In these embodiments, a GPS module may not be employed because the fixed position is known a priori.

LPR system 100 may perform image analysis on each collected image to identify the license plate number associated with each image. Finally, LPR system 100 stores a record of each license plate number identified, and the time and location associated with each image capture as an LPR instance in LPR database 102 stored on LPR server 101.

In the embodiment depicted in FIG. 1, computer 110 is communicatively linked to LPR server 101 via the Internet 105. However, computer 110 may be communicatively linked to LPR server 101 by any communication link known to those skilled in the art. For example, computer 110 may be communicatively linked to LPR server 101 over a local area network (LAN) or over a wireless network. Similarly, computer 110 may also be communicatively linked to a public information server 103 via the Internet 105. A public information server 103 stores a database 104 of publically available information. As used herein, publically available information includes both information that is only available to parties with a permissible purpose (e.g., law enforcement, etc.) and information that is available without restrictions on purpose of use. Examples of publically available information include vehicle registrations, information from private investigative reports, and information from public investigative reports (e.g., law enforcement profiles). Other sources of information may be contemplated (e.g., property records, birth records, death records, marriage records, etc.). By way of example, a database 104 of property records may be stored on a server 103 administered by a government entity (e.g., Alameda County, Calif., USA). Other databases 104 of publically available information may be stored on servers 103 administered by private organizations (e.g., Lexis-Nexis®, accessible at www.lexisnexis.com, TLO®, accessible at www.tlo.com, etc.). Some public information servers 103 are accessible to the public without a fee; others require payment of a fee to become accessible.

After obtaining access privileges and a communication link to a public information server 103, VPA tool 105 executed on computer 110 is able to request and receive information from a public information server 103. By way of non-limiting example, VPA tool 105 may generate a public information query 106 that is transmitted from computer 110 to public information server 103. For example, public information query 106 may include a request to search public information database 104 for a property record associated with a property located at 123 Elm Street, Livermore, Calif., USA). A database query such as public information query 106 may be any format known to those skilled in the art (e.g., HTML script, PERL script, XML script, etc.). After searching public information database 104 in accordance with the public information query 106, a public information response 107 is communicated from public information server 103 to computer 110. Public information response 107 may include the desired search results in any format known to those skilled in the art (e.g., HTML, XML, ASCII, etc.). For example, public information query 106 may include ownership information, tax information, loan information, and transaction information associated with the property at 123 Elm Street, Livermore, Calif., USA.

In one aspect, LPR information query 108 includes an indication of a physical location, and in response, LPR server 101 communicates LPR information response 109 that includes LPR instances stored in LPR database 102 based on the physical location.

Figure 11:
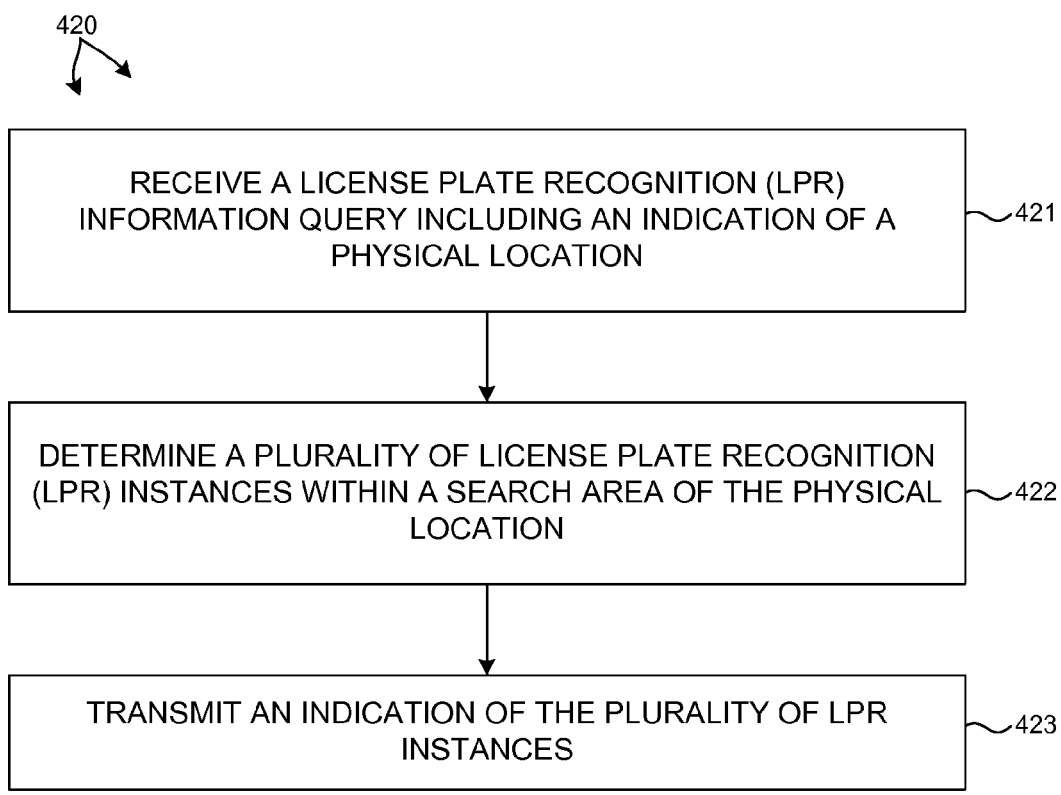
FIG. 11 is illustrative of a flowchart of a method 420 of determining LPR instances stored in a LPR database 102 based on their physical location and a license plate number associated with a person of interest.

FIG. 11 is illustrative of a flowchart of a method 420 of retrieving LPR instances stored in LPR database 102 based on their physical location and a license plate number associated with a person of interest. In one example of block 421, LPR server 101 is able to receive an LPR information query 108 from computer 110 including an indication of a physical location and a license plate number associated with a person of interest. In one example, LPR information query 108 indicates a geo coded location corresponding to a physical location and a license plate number. For example, LPR information query 108 indicates the GPS coordinates of a property at 123 Elm Street, Livermore, Calif., USA. In block 422, LPR server 101 determines a list of LPR instances 141 located within a search area around the physical location in response to the LPR information query 108. In some examples, LPR server 101 determines whether any of the LPR instances 141 match the license plate number associated with the person of interest. In block 423, LPR server 101 transmits the list of LPR instances to computer 110 as part of LPR information response 109. In some examples, LPR server 101 indicates whether any of the LPR instances 141 match the license plate number associated with the person of interest as part of LPR information response 109.

In some examples, a search area may be a circle of fixed radius (e.g., one mile) centered on the physical location. In other examples, the search area may be defined progressively. For example, LPR server 101 may search for LPR instances in order of their distance from the geo coded physical location. The search may be stopped when a certain number of LPR instance are found (e.g., find the one hundred LPR instances closest to the geo coded physical location). The search could also be stopped when the distance between successive LPR instances exceeds a threshold value (e.g., stop search when the next furthest LPR instance is further from the previous one by more than the threshold value). In one example, the threshold value could be a multiple (e.g., three times) the average distance between the previously identified LPR instances. Other threshold values may be contemplated (e.g., fixed values, a multiple of the average distance of the previously identified LPR instances to the physical location, etc.). This may be advantageous to flexibly adjust for different areas where cars are relatively densely packed or sparsely packed.

In another example, LPR information query 108 indicates three or more geo coded locations that define a search area (e.g., a polygon defined by a group of geo coded points). In response, LPR database 102 determines a list of LPR instances 141 located within the search area.

In yet another example, LPR information query 108 indicates a named location that corresponds to a search area (e.g., a city name indicates a search area corresponding to the area of the city, a county name indicates a search area corresponding to the area of the county, etc). In response, LPR database 102 determines a list of LPR instances 141 located within the search area corresponding to the named location.

In some other examples, LPR information query 108 includes an indication of a physical location and at least one license plate number. In response, LPR server 101 determines LPR instances stored in LPR database 102 that match the at least one license plate number and are within a search area about the physical location. LPR server 101 communicates these results as part of LPR information response 109.

LPR database 102 is searchable based on the indication of a search area communicated by LPR information query 108. For example, if LPR information query 108 communicates an indication of a search area by a county name (e.g., Alameda County, Calif., USA), then LPR database 102 is searchable by county. In some embodiments, LPR database 102 is indexed for efficient search by tools available with commercially available database software packages (e.g., Oracle®, Microsoft SQL Server®, IBM DB2®, etc.). In this manner, LPR database 102 is configured to be efficiently searched by the desired search area communicated by LPR information query 108.

LPR information query 108 may be any format known to those skilled in the art (e.g., HTML script, PERL script, XML script, etc.). LPR server 101 communicates the list of LPR instances 141 to computer 110. LPR information response 109 may include the search results in any format known to those skilled in the art (e.g., HTML, XML, ASCII, etc.).

Figure 2:
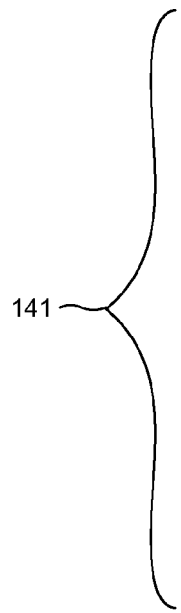
FIG. 2 is illustrative of a plurality of LPR instances 141 stored in memory 150.

FIG. 2 is illustrative of a plurality of LPR instances 141 communicated as part of LPR information response 109 stored in memory 150. An LPR instance includes an indication of the particular vehicle license plate number recognized by an LPR system 100 at a particular location and time. In this example, each of the LPR instances 141 is located within a circle of one mile radius centered on the physical location of the property at 123 Elm Street, Livermore, Calif., USA. LPR instances 151-158 each record an indication of the recognized vehicle license plate number, an indication of the location where the plate was recognized, and an indication of the time that the plate was recognized. In other examples, additional information may be stored with any LPR instance. For example, an index identifier may be associated with each LPR instance. The index identifier may be useful to facilitate sorting and organizing the plurality of LPR instances. In another example, an amount of image data indicating a visual image of the vehicle that includes the vehicle license plate may be associated with each LPR instance. This may be useful to allow a human to visually confirm the license plate number recognized by the LPR system. In another example, a mailing address associated the physical location is associated with an LPR instance. In another example, the make, model, and production year of the vehicle registered with the license plate number is associated with the LPR instance.

As illustrated, LPR instance 151 indicates that a license plate number "XYZ123" was recognized by LPR system 100 at the location given by GPS coordinates "27.657912, −92.579146" at 11:14 pm on Mar. 12, 2010. LPR instance 152 indicates that the same license plate number was recognized by LPR system 100 at a different location and time. LPR instance 153 indicates that a license plate number "ABC125" was recognized by LPR system 100 at approximately the same location as LPR instance 151 at approximately the same time. LPR instance 154 indicates that a license plate number "RUX155" was recognized by LPR system 100 at approximately the same location as LPR instance 152 at approximately the same time.

Computer 110 executing VPA tool 105 is able to receive public information responses 107 and LPR information responses 109 and store the information in memory 150. This information is accessible by VPA tool 105 for further analysis. In one example, VPA tool 105 parses the received information and generates a Microsoft Excel® spreadsheet that presents the received information in an organized manner (e.g., tables with headings, plots, charts, etc.). In one example, VPA tool 105 includes Microsoft Excel® scripts that perform additional analysis and present results to a user in accordance with the methods described herein.

In another aspect, the relative likelihood of locating a person of interest at a particular location at a future point in time is determined based on LPR information. In one example, the relative likelihood of locating the person of interest is based on past LPR instances of a vehicle associated with the person of interest at particular locations.

Figure 3:
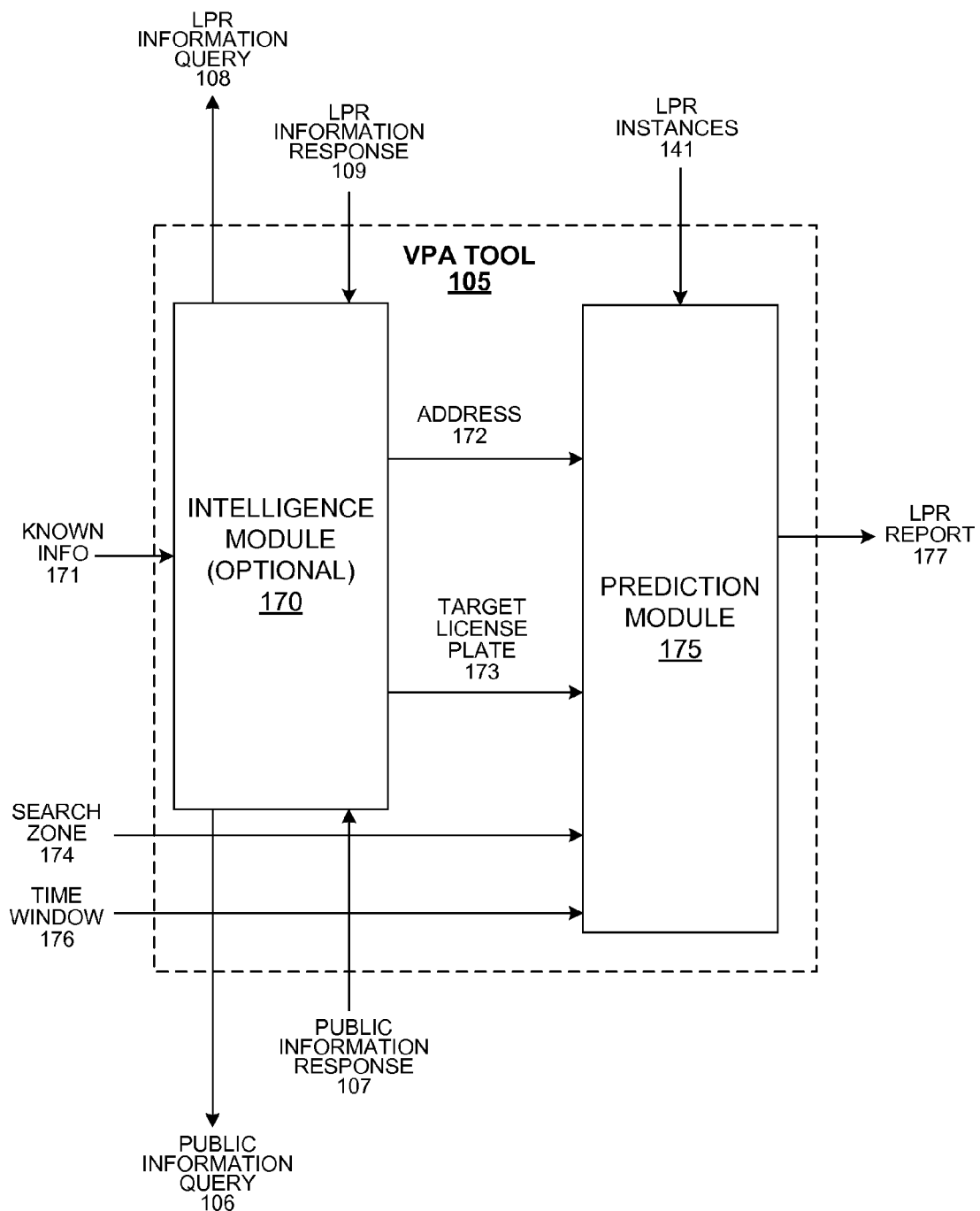
FIG. 3 is illustrative of a VPA tool 105 operable to determine the relative likelihood of locating a person of interest based on LPR information.
Figure 4:
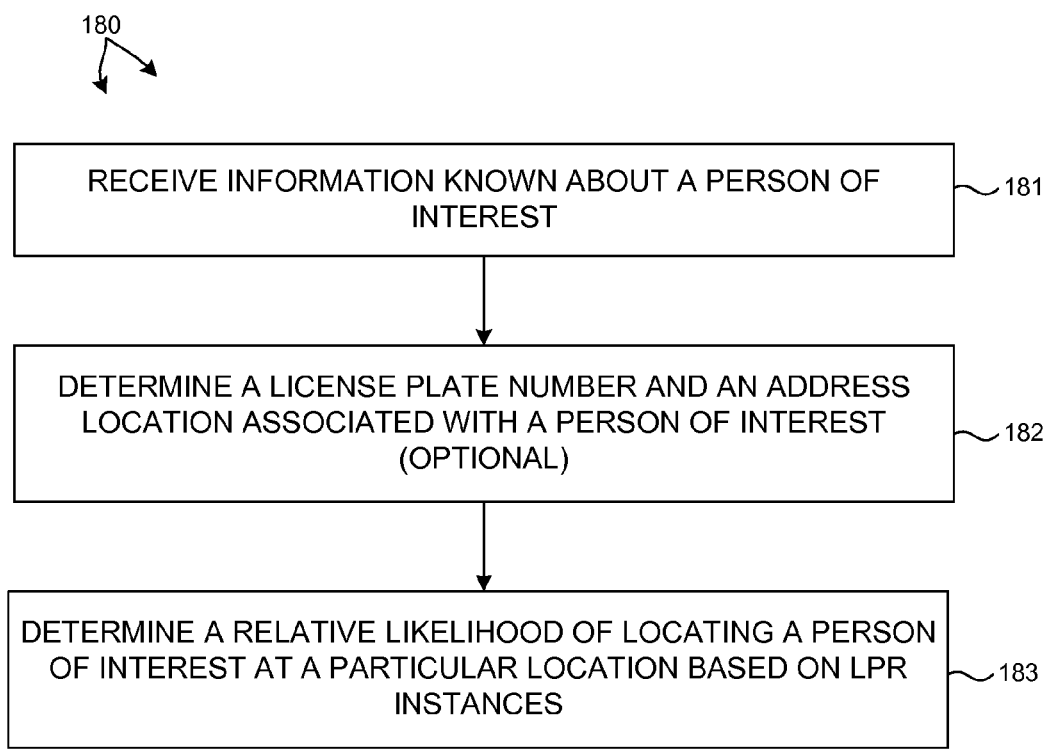
FIG. 4 is illustrative of a flowchart of a method 180 of determining the relative likelihood of locating a person of interest based on LPR information.

FIG. 3 is illustrative of a VPA tool 105 operable in accordance with the method of determining the relative likelihood of locating a person of interest based on LPR information 180 illustrated in FIG. 4. This illustration and corresponding explanation are provided by way of example as many other exemplary operational scenarios may be contemplated. In the depicted embodiment, VPA tool 105 includes an intelligence module 170 and a prediction module 175. In the depicted embodiment, a user provides known information 171 about a subject of interest, and in response, VPA tool 105 generates an LPR report 177 that communicates the relative likelihood of locating a person of interest at various locations at particular points in time. As depicted, intelligence module 170 generates a list of at least one address 172 and at least one target license plate number 173 associated with the person of interest. Based on the addresses 172 and target license plate numbers 173, prediction module 175 determines the relative likelihood of locating a person of interest at various locations (e.g., addresses associated with person of interest) at a particular time.

In some other embodiments, VPA tool 105 may not include intelligence module 170. In these embodiments, a user may directly provide addresses 172 and target license plate numbers 173 associated with the person of interest. Based on this information, VPA tool 105 generates an LPR report 177 that communicates the relative likelihood of locating a person of interest at various locations at particular points in time without employing intelligence module 170.

In one example of block 181 of method 180, intelligence module 170 receives known information 171 about a person of interest from a user of VPA tool 105. By way of non-limiting example, known information 171 may include a social security number, a name, a driver's license number, a vehicle identification number (VIN) of a vehicle associated with the person of interest, a license plate number of a vehicle associated with the person of interest, the name of the person of interest, date of birth, name of a city where the person of interest once lived, an address where the person of interest may have once been located, etc. These examples of known information 171 are exemplary and other types of known information 171 may be contemplated. Any of these types of known information may be provided as input to intelligence module 170. By way of non-limiting example, known information 171 may be entered by a user in a dialog box of a graphical user interface (GUI) of VPA tool 105. VPA tool 105 receives the known information 105 from a user and stores this information in memory 150.

In one example of block 182, intelligence module 170 determines at least one license plate number and at least one address associated with the person of interest based on known information 171. In some examples, intelligence module 170 gathers information from an LPR database 102 and a public information database 104 to determine at least one license plate number and at least one address associated with the person of interest. For example, intelligence module 170 may communicate a public information query 106 to a public information server 103 that includes a database 104 of vehicle registry information administered by the government (e.g., California Department of Motor Vehicles). Query 106 may request vehicle information associated with a license plate number received from a user as part of known information 171. Public information response 107 may include the name of the registered owner of vehicle registered with the license plate number. Intelligence module 170 may then communicate another query 106 to a server 103 that includes a database of property records requesting information about property owned by the registered owner of the vehicle. A response 107 may include address information of a property owned by the registered owner of the vehicle. In this manner, intelligence module determines an address associated with a person of interest.

In addition or alternatively, intelligence module 170 may communicate a LPR information query 108 to an LPR server 101 requesting a report of all LPR instances that involve a license plate number received from a user as part of known information 171. In response LPR server 101 communicates LPR information response 109 that includes a list of LPR instances that involve the license plate number and the addresses associated with each LPR instance. In this manner, intelligence module determines an address associated with a person of interest. These examples are presented for illustrative purposes and are not limiting. Other information sources may be communicatively coupled to computer 110 and VPA tool 105 may communicate queries for information and receive responses from these sources to determine a license plate number and address of a person of interest. For example, information from private investigative reports and information from public investigative reports (e.g., law enforcement profiles) property records, birth records, death records, and marriage records, etc. may be accessed from a number of databases 104. Additional sources of information may be contemplated.

In another example, intelligence module 170 receives a vehicle identification number (VIN) of a vehicle associated with the person of interest as part of known information 170. By querying vehicle registry databases, intelligence module 170 determines a current address of the registered owner of vehicle and the current license plate number associated with the vehicle. In another example, intelligence module 170 receives a social security number of a person of interest as part of known information 170. By searching public investigative reports, intelligence module 170 determines a list of license plate numbers and addresses associated with the person of interest. Other examples may be contemplated. Any combination of LPR databases 102 and public information databases 104 in any order may be queried by intelligence module 170 to determine at least one address 172 and at least one license plate number 173 associated with a person of interest.

In some examples, block 182 is optional. For example, in some cases, a user may provide at least one license plate number and at least one address associated with the person of interest as part of known information 170. In these cases, it may be unnecessary to gather additional information about the person of interest.

Figure 9:
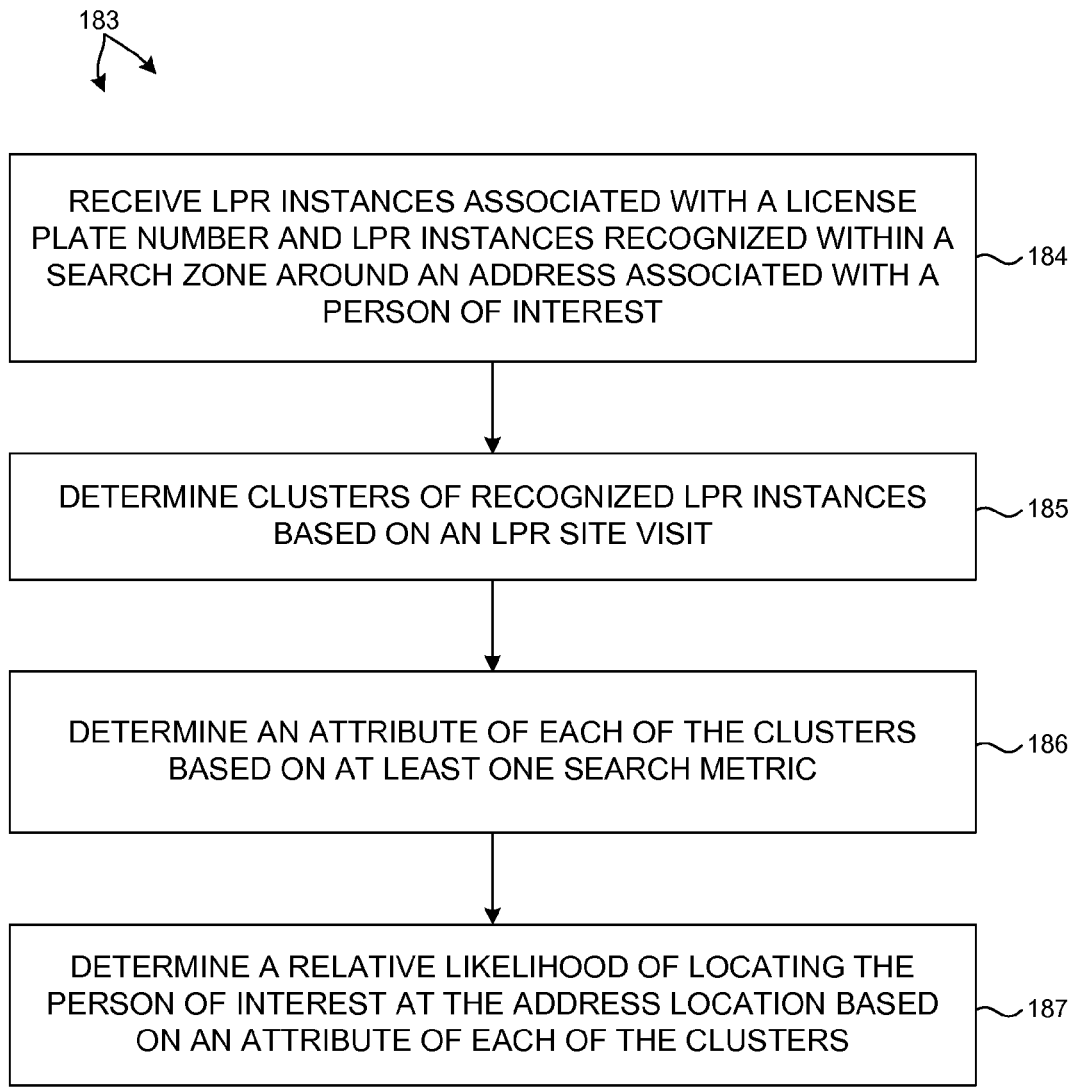
FIG. 9 is illustrative of a flowchart of a method 183 of determining a relative likelihood of locating a person of interest at a particular location based on LPR instances.

In block 183 of method 180, prediction module 175 determines a relative likelihood of locating a person of interest at a particular location based on LPR instances. FIG. 9 illustrates a flowchart of block 183 of method 180 in one example. In block 184 of method 180, prediction module 175 of VPA tool 105 receives a list of LPR instances 141 associated with at least one license plate number 173 and at least one address associated with a person of interest. In some examples, LPR instances 141 associated with an address include all LPR instances recognized within a search zone around the address location (e.g., within a one mile radius of the address location). In one example, prediction module 175 includes a search zone parameter and an address geo-coded to a Global Positioning System (GPS) point as part of a LPR information query 108. In one example, LPR server 101 is configured to generate a list of LPR instances within a search zone of the address location by comparing the GPS coordinates of the address with those of the LPR instances stored within LPR database 102. In response to the query, computer 110 receives LPR instances 141 recognized within the specified search zone of the address. In addition, prediction module 175 can filter LPR instances 141 based on a successively smaller search zones. In some examples, the size of the search zone may be predetermined by prediction module 175. In other examples, the size of the search zone 174 may be received from a user of VPA tool 105. In this manner, a user may adjust the search results by changing the size of the search zone based on the user's experience. In some examples, a time window 176 may be received from the user to further limit the search results. For example, a user may restrict the search to LPR instances within the past two years to limit the search results to relatively recent potential locations of the person of interest.

In block 185, prediction module 175 determines clusters of LPR instances recognized within a search zone and time window around each address 172 associated with the person of interest. In some examples, prediction module 175 determines clusters of LPR instances within a search area of a physical location over an arbitrary period of time. In some examples, the search area may be a circle of fixed radius (e.g., one mile) centered on the physical location. In other examples, the search area may be defined progressively. For example, prediction tool 175 can search for LPR instances in order of their distance from the geo coded physical location. The search can be stopped when a certain number of LPR instance are found (e.g., find the one hundred LPR instances closest to the geo coded physical location). The search could also be stopped when the distance between successive LPR instances exceeds a threshold value (e.g., stop search when the next furthest LPR instance is further from the previous one by more than the threshold value). In one example, the threshold value could be determined as a multiple of the average distance between the previously identified LPR instances. Other threshold values may be contemplated (e.g., fixed values, a multiple of the average distance of the previously identified LPR instances to the physical location, etc.). This may be advantageous to flexibly adjust for different areas where cars are relatively densely packed or sparsely packed.

In another example, prediction module 175 determines clusters of LPR instances within a search area that were recognized during a LPR site visit. An LPR site visit is a period of time where an LPR unit approached a particular location, collected LPR information, and subsequently left the area. For example, an LPR unit may first visit an apartment complex that is within the search zone between 4:30 pm and 4:45 pm on Jan. 10, 2009. During this visiting time period, the LPR unit scans the license plates of many vehicles parked in and around the apartment complex. The LPR instances generated during this visiting time period are grouped into a cluster by prediction tool 175 because all of these LPR instances were gathered over a relatively short period of time (e.g., the visiting time period of the LPR unit). A few weeks later, the LPR unit may revisit the apartment complex between 2:30 pm and 3:00 pm on Mar. 4, 2009. Again, during this period of time, the LPR unit scans the license plates of many vehicles parked in and around the apartment complex. The LPR instances generated during this period of time are grouped into another cluster by prediction tool 175 because all of these LPR instances were gathered over a different visiting time period. Clusters may be determined based on groups of LPR instances recognized at each visit of a search area that includes an address location associated with the person of interest.

In some examples, prediction tool 175 determines clusters of LPR instances by analyzing the time stamps of each LPR instance of a group of LPR instances recognized within a search zone of a particular address. In one example, prediction tool 175 arranges a group of LPR instances within a search zone of a particular address in chronological order. Prediction tool then steps through the chronologically ordered list and determines the time difference between successive LPR instances based on their respective time stamps. If the time difference between successive LPR instances is less than a predetermined threshold, then the prediction module 175 groups these two LPR instances in the same cluster. If the time difference between successive LPR instances is greater than a predetermined threshold, the successive LPR instances are separated into different clusters. The predetermined threshold value may be assigned automatically by prediction tool 175 or received from a user. In one example, the predetermined threshold value is five minutes; however, other values may be contemplated.

In one example of block 186 of method 180, prediction module 175 determines at least one attribute of each of the clusters based on at least one search metric. Example search metrics include, but are not limited to: duration of an LPR site visit, number of LPR instances in the cluster, whether an LPR instance within the cluster includes a license plate number associated with the person of interest, whether an LPR instance within the cluster does not include a license plate number associated with the person of interest, date and time of associated with the cluster, whether the cluster location is a residence address, a place of employment, a retail business frequented by a person of interest, a traffic intersection or freeway location frequented by a person, etc. Prediction module 175 assigns a value to each cluster of LPR instances around different address locations based on the attributes of each cluster. In this manner, search metrics are useful for characterizing clusters of LPR instances so that clusters can be compared and ranked relative to each other.

Prediction tool 175 determines an attribute of each cluster of LPR instances by analyzing the LPR information associated with each LPR instance within the cluster. By way of example, prediction tool 175 examines the license plate numbers associated with each LPR instance in a cluster and determines whether any of these numbers match one or more license plate numbers 173 associated with a person of interest. An exemplary attribute of the cluster is whether the cluster included a match with a license plate number 173 associated with the person of interest. In another example, prediction tool 175 determines the time duration of a site visit by determining the difference in time between LPR instances with the earliest and latest time stamps within a cluster. This time is another exemplary attribute of the cluster. In other examples, prediction tool 175 may determine many attributes associated with each cluster for a variety of search metrics.

The relative value of a cluster as a predictor of where a person of interest may be located is based on the attributes of each cluster. In one example of block 187 of method 180, prediction module 175 determines a relative likelihood of locating the person of interest within a distance of the address location associated with the person of interest based on the attributes of each of the clusters. For example, an apartment complex within the search zone of one of the addresses associated with the person of interest is visited ten times in the past year (e.g., ten clusters). From the attributes associated with each of the clusters, prediction module 175 determines that a license plate number associated with the person of interest was found three out of the ten visits (e.g., three of the ten clusters include an LPR instance of a target license plate number). Moreover, from the attributes of each cluster, prediction module 175 determines that each of three sightings of the target license plate number occurred during evening hours. Based on this analysis, prediction module 175 determines that the relative likelihood of reaching the person of interest personally at a given point in time is 0% during the daytime, but 30% during the evening.

In addition, the relative likelihood of locating a person of interest at a particular address location compared to another address location is based on attributes of groups of clusters associated with each address location. For example, an apartment complex within the search zone of one of the addresses associated with the person of interest is visited ten times in the past year (e.g., ten clusters). However, an office complex within the search zone of another address associated with the person of interest was visited twice, over four years ago. A license plate associated with the person of interest was found during the LPR site visits to the office complex. But, the relatively small number and the age of the clusters of LPR visits to the office complex make this information less valuable than the more recent and more frequent clusters of LPR visits to the apartment complex. To account for this, prediction module 175 scales the value of clusters of LPR visits to different address locations based on the age and frequency of LPR visits to the address location.

This analysis may be performed for a number of different address locations to generate the relative likelihood of reaching a person of interest within the search zone at a given point in time. In this manner, clusters are scored based on their attributes and scaled based on attributes of groups of clusters at a particular address location. Based on this scoring, clusters are ranked in order of their value to determine the relative likelihood of locating a person of interest.

VPA tool 105 communicates the relative likelihood to the user, for example, by generating a report (e.g. text file). An LPR report 177 includes the relative likelihood associated with finding the person of interest within a distance of each address location. In some examples, VPA tool 105 may rank the probabilities and generate a list of address locations (and optionally zones around each address location) and time periods where the person of interest may be reached in descending order of likelihood. In this manner, the user can prioritize efforts made to reach the person of interest. In another example, VPA tool 105 grades each address associated with the person of interest based on the probabilities. For example, any address location and time period with a probability of reaching the person of interest greater than 20% is graded as a "GREAT" prospect, while any address location and time period with a probability of reaching the person of interest less than 1% is graded as a "POOR" prospect. Any number of grades and methods of scaling grades by the determined probabilities may be contemplated.

As described herein, addresses and license plate numbers associated with a person of interest are provided to prediction module 175. For example, addresses and license plate numbers may be provided directly by a user of VPA 105 or by intelligence module 170 that incorporates intelligence information gleaned from sources outside of LPR system 100. In another aspect, addresses and license plate numbers associated with a person of interest are determined by LPR system 100.

In some examples, license plate numbers are associated with a target license plate number based on their appearance within a search zone and time window of two different LPR instances of a target license plate.

Figure 5:
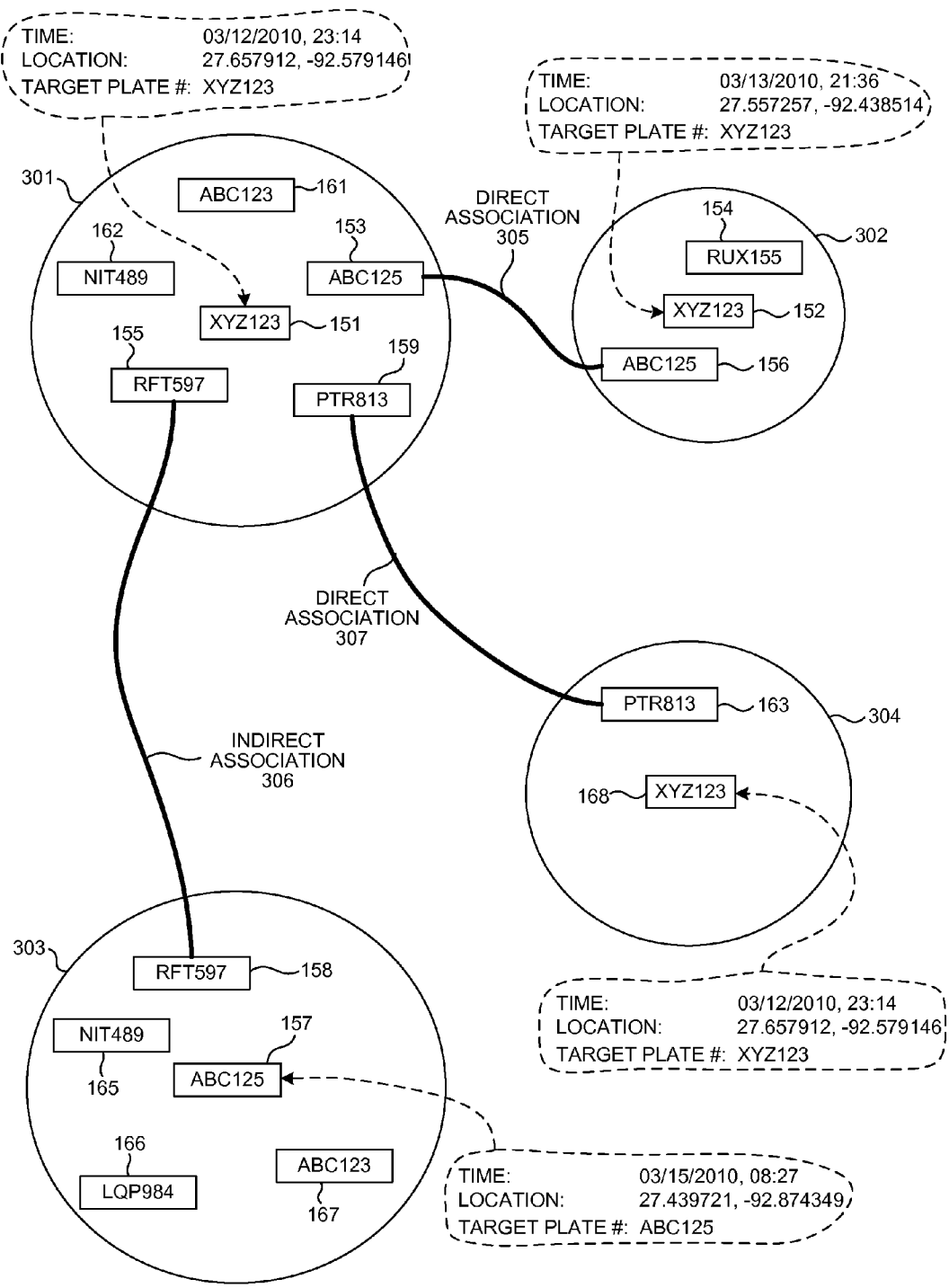
FIG. 5 is illustrative of an exemplary operational scenario of VPA tool 105 in accordance with the methods of multi-vehicle association 400 and 410 illustrated in FIG. 6 and FIG. 10, respectively.
Figure 6:
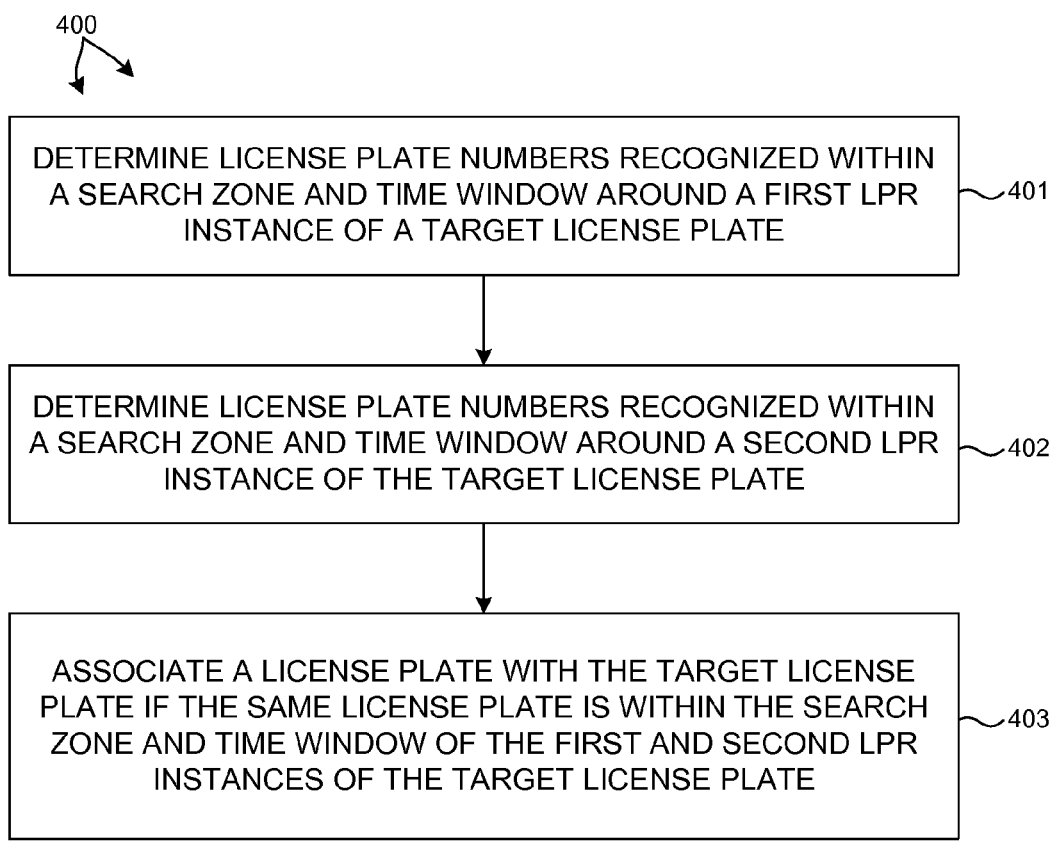
FIG. 6 is illustrative of a flowchart of a method 400 of associating a license plate number with a person of interest.
Figure 10:
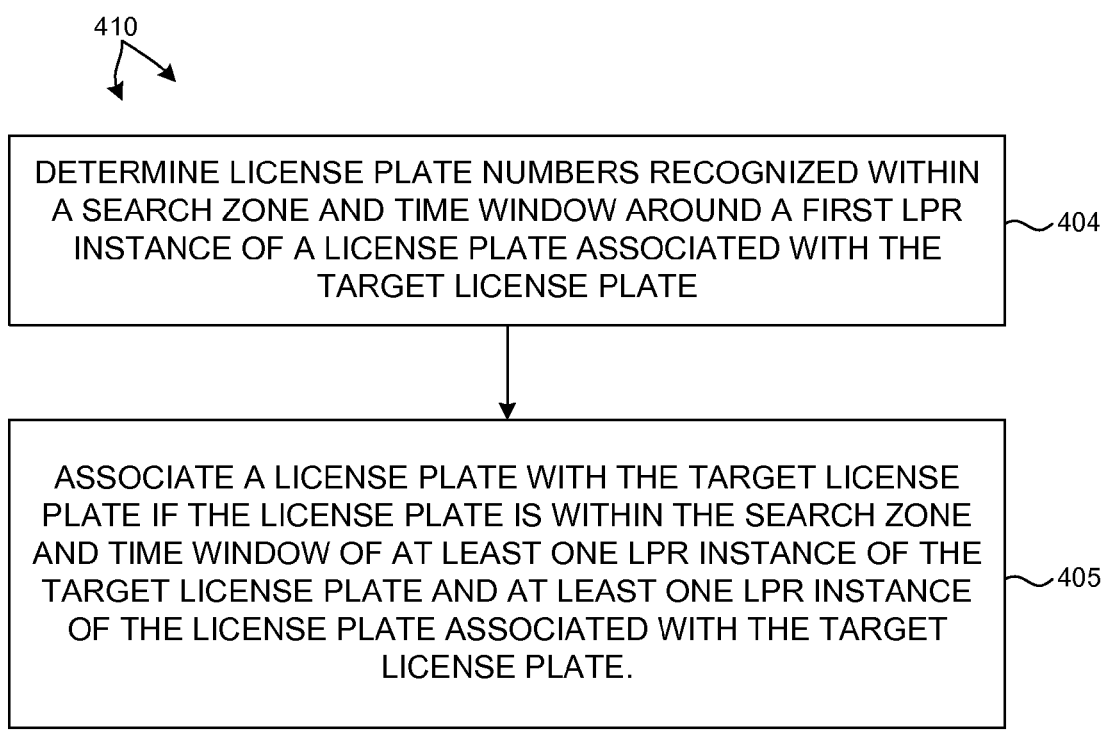
FIG. 10 is illustrative of a flowchart of a method 410 of associating a license plate number with a person of interest.

FIG. 5 is illustrative of an exemplary operational scenario of VPA tool 105 in accordance with the methods of multi-vehicle association 400 and 410 illustrated in FIG. 6 and FIG. 10, respectively. This illustration and corresponding explanation are provided by way of example as many other exemplary operational scenarios may be contemplated.

In block 401 of method 400, license plate numbers recognized within a search zone and time window of a first LPR instance of a target license plate are determined. As illustrated in FIG. 5, license plate numbers "ABC123" associated with LPR instance 161, "ABC125 associated with LPR instance 153, "PTR813" associated with LPR instance 159, "RFT597" associated with LPR instance 155, and "NIT489" associated with LPR instance 162 are all within the search zone 301 and time window (not shown) of LPR instance 151. In other words, these five license plates were all located within the search zone and time window of license plate number "XYZ123" when and where it was recognized by LPR system 100 at LPR instance 151. The size of search zone 301 is adjustable. For example, in some examples, search zone 301 is the area within twenty meters of license plate number "XYZ123" at LPR instance 151. In some other examples, search zone 301 is the area within one hundred meters of license plate number "XYZ123" at LPR instance 151. The size of search zone 301 may be arbitrarily large or small. However, if the size of search zone 301 is too large, too many associations with license plate "XYZ123" may be formed to be useful. Conversely, if the size of search zone 301 is too small, too few associations may be formed and valuable association information may be lost. The size of the time window around a particular LPR instance (e.g., LPR instance 151) may also be chosen arbitrarily. For example, a time window of twelve hours before LPR instance 151 to twelve hours after LPR instance 151 may be chosen. In this manner, any license plate within search zone 301 that is recognized by LPR system 100 within a time window twelve hours before to twelve hours after LPR instance 151 will be identified. This twenty four hour window is provided by way of example, and is selected to capture associations that might occur with daily regularity. However, other time windows may be considered (e.g. time windows of weekly or monthly duration). In addition, the selected time window does not have to be symmetric about the LPR instance 151. For example, the time window may any time between the time of LPR instance 151 and twelve hours later. In some examples, the time window may be approximately zero. In these examples, all license plates present within the search zone around the target license plate at the time of LPR instance 151 will be identified.

In block 402 of method 400, license plate numbers recognized within a search zone and time window of a second LPR instance of the target license plate are determined. As illustrated in FIG. 5, license plate numbers "ABC125" associated with LPR instance 156 and "RUX155 associated with LPR instance 154 are within the search zone 302 and time window (not shown) of LPR instance 152 associated with target license plate number "XYZ123." In other words, these two license plates were located within the search zone and time window of license plate number "XYZ123" when and where it was recognized by LPR system 100 at LPR instance 152. Search zone 302 may be selected to be the same or different size as search zone 301. Similarly, the selected time window may the same or different.

In block 403 of method 400, a license plate number is associated with the target license plate if the license plate number is within the search zone and time window of two different LPR instances of the target license plate. As illustrated in FIG. 5, license plate number "ABC125" is within the search zones and time windows associated with LPR instances 151 and 152 associated with license plate number "XYZ123." In other words, "ABC125" was found near "XYZ123" in both position and time for two different instances. Based on this relationship, "XYZ123" and "ABC125" are determined to be directly associated by association 305. This particular association is a direct association. In one example, a direct association occurs when a license plate number is within the search zones and time windows associated with two different LPR instances associated with a target license plate. Other examples of direct association may be contemplated.

In another example, "PTR813" is directly associated with "XYZ123" by direct association 307. As illustrated "PTR813" was recognized within the search zones and time windows associated with two different LPR instances (e.g., LPR instances 151 and 168) of "XYZ123." More specifically, "PTR813" is associated with both LPR instance 159 within the search zone 301 and time window of LPR instance 151 and LPR instance 163 within the search zone 304 and time window of LPR instance 168. In this manner, many license plate numbers may be found to be directly associated with target license plate, "XYZ123."

In yet another aspect, a license plate number is associated with a target license plate number if the license plate is within a search zone and time window of both an LPR instance of the target license plate number and an LPR instance of a license plate associated with the target license plate number.

In block 404 of method 410 illustrated in FIG. 10, license plate numbers recognized within a search zone and time window of a first LPR instance of a license plate associated with the target license plate are determined. As illustrated in FIG. 5, license plate numbers "ABC123" associated with LPR instance 167, "LQP984" associated with LPR instance 166, "NIT489" associated with LPR instance 165, and "RFT597" associated with LPR instance 158 are within the search zone 303 and time window (not shown) of LPR instance 157 associated with license plate number "ABC125." License plate number "ABC125" is associated with target license plate number "XYZ123" as previously discussed herein.

In block 405 of method 400, a license plate number is associated with the target license plate if the license plate number is within the search zone and time window of both an LPR instance of the target license plate and an LPR instance of a license plate associated with the target license plate. As illustrated in FIG. 5, "XYZ123" is associated with "ABC125" by association 305. Furthermore, license plate number "RFT597" is within the search zone and time window associated with both LPR instance 157 associated with license plate number "ABC125" and LPR instance 151 associated with license plate number "XYZ123." Based on this relationship, "RFT597" and "XYZ123" are associated. This particular association is an indirect association 306. As illustrated, "RFT597" is not within the search zones and time windows associated with two different LPR instances of "XYZ123." Thus there is no direct association between "RFT597" and "XYZ123." However, "RFT597" has appeared within the search zones and time windows around an LPR instance of "XYZ123" and an LPR instance of an associate of "XYZ123." Thus, "RFT597" is indirectly associated with "XYZ123." Other examples of indirect association may be contemplated.

Another way to describe the indirect association between "RFT597" and "XYZ123" is as a direct association, once removed. In this manner, direct associations, twice removed, thrice removed, and so forth may also be defined by extending the methodology described in blocks 404 and 405. For example, by applying the blocks 404 and 405 to an LPR instance of a license plate that is once removed from "XYZ123" (e.g., "RFT597"), license plates that are twice removed from "XYZ123" may be identified.

As discussed above, the methods described herein may be executed by VPA tool 105 running within computer 110. An operator may interact with VPA tool 105 via a locally delivered user interface (e.g., GUI displayed by terminal equipment directly connected to computer 110). In other embodiments, an operator may interact with VPA tool 105 via a web interface communicated over the internet.

Figure 7:
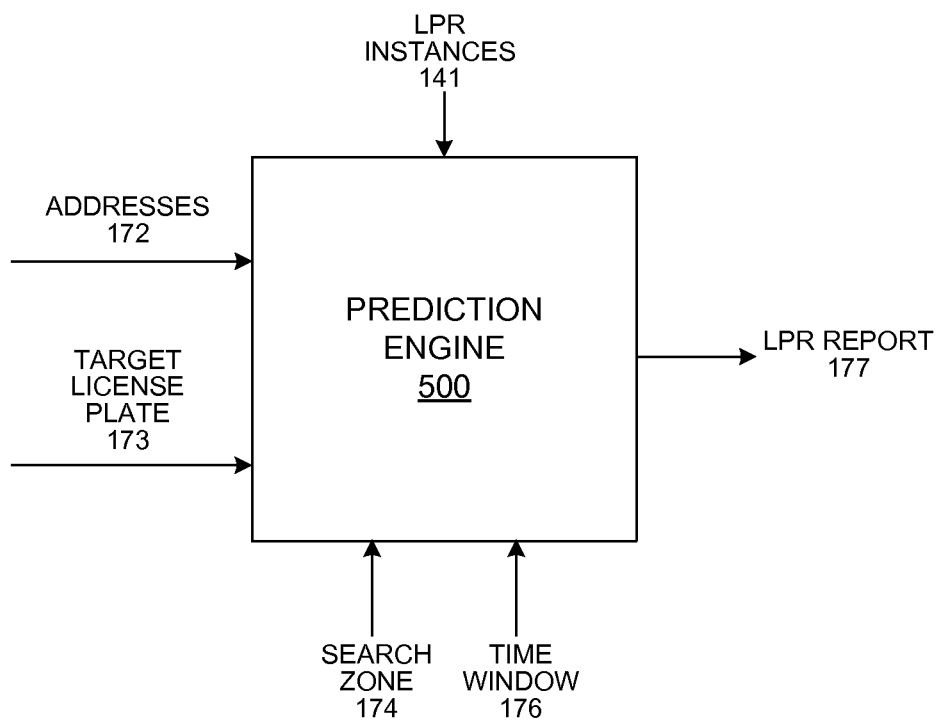
FIG. 7 illustrates a prediction engine 500 configured to implement VPA functionality as discussed herein.
Figure 8:
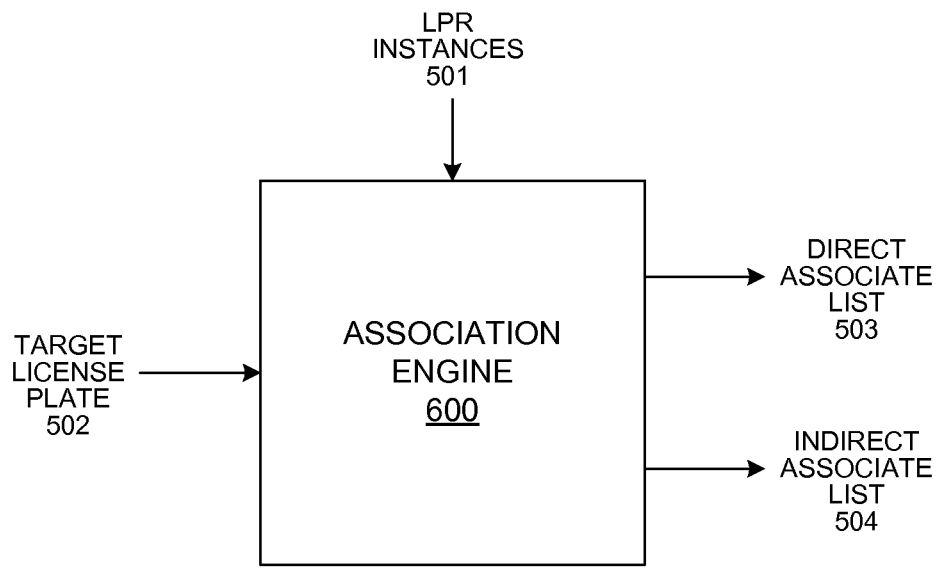
FIG. 8 illustrates an association engine 600 configured to implement VPA functionality as discussed herein.

Although, the methods described herein may be executed by VPA tool 105 running within computer 110, they may also be executed by dedicated hardware. FIG. 7 illustrates a prediction engine 500 configured to implement VPA functionality as discussed herein. In one example, prediction engine 500 receives addresses 172, license plate numbers associated with a person of interest, and LPR instances 141 as input. Prediction engine 500 implements VPA functionality as discussed herein and generates an LPR report 177 based on the probabilities associated with locating the person of interest at the address locations 172. Similarly, FIG. 8 illustrates an association engine 600 configured to implement VPA functionality as discussed herein. In one example, association engine 600 receives a target license plate 502 (e.g., "XYZ123") and a plurality of LPR instances 501 (e.g., LPR instances 141) as input. Association engine 600 implements VPA functionality as discussed herein and generates a list of direct associates 503 and a list of indirect associates 504 of target license plate 502.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
receiving an indication of a plurality of license plate recognition (LPR) instances within a search area of a physical location associated with a person of interest;
determining a plurality of clusters of the plurality of license plate recognition (LPR) instances associated with the physical location, wherein the determining of each of the clusters of the plurality of LPR instances involves:
  determining a time difference between successive LPR instances; and
  determining if the time difference between successive LPR instances is less than a predetermined threshold; and
determining at least one attribute of each of the plurality of clusters of LPR instances; and
determining the relative likelihood of locating the person of interest at the physical location based on the at least one attribute.

2. The method of claim 1, further comprising:
receiving a license plate recognition (LPR) information query including an indication of the physical location and a target license plate number associated with the person of interest; and
determining the plurality of license plate recognition (LPR) instances within the search area of the physical location in response to receiving the LPR information query.

3. The method of claim 2,
wherein the determining that least one attribute of each of the plurality of clusters is based on at least one search metric.

4. The method of claim 1, wherein an LPR instance of the plurality of LPR instances includes an indication of a vehicle license plate number, an indication of a physical location, and an indication of a time when the LPR instance was captured by an LPR system.

5. The method of claim 2, wherein a license plate number associated with each of the plurality of LPR instances matches the target license plate number associated with the person of interest.

6. A method comprising:
receiving an indication of a physical location and a license plate number associated with a person of interest;
determining a plurality of clusters of license plate recognition (LPR) instances associated with the physical location and the license plate number, wherein the determining of each of the clusters of LPR instances involves:
  determining a time difference between successive LPR instances; and
  determining if the time difference between successive LPR instances is less than a predetermined threshold; and
determining a relative likelihood of locating the person of interest at a particular location at a future point in time based on at least one attribute of the clusters of LPR instances associated with the physical location and the license plate number.

7. The method of claim 6, wherein the determining the relative likelihood of locating the person of interest involves:
determining the at least one attribute of each of the clusters based on at least one search metric.

8. The method of claim 6, wherein the determining of the relative likelihood of locating a person of interest at the physical location involves scaling a value of a cluster based on an amount of time since the last LPR site visit to the physical location.

9. The method of claim 6, wherein the determining of the relative likelihood of locating a person of interest at the physical location involves scaling a value of a cluster based on a number of LPR site visits to the physical location.

10. An apparatus comprising:
a processor; and
a memory storing an amount of program code that, when executed causes the processor to
  receive an indication of a plurality of license plate recognition (LPR) instances within a search area of a physical location associated with a person of interest;
  determine a plurality of clusters of the plurality of license plate recognition (LPR) instances associated with the physical location, wherein the determining of each of the clusters of the plurality of LPR instances involves:
    determining a time difference between successive LPR instances; and
    determining if the time difference between successive LPR instances is less than a predetermined threshold; and
  determine at least one attribute of each of the plurality of clusters of LPR instances; and
  determine the relative likelihood of locating the person of interest at the physical location based on the at least one attribute.

11. The apparatus of claim 10, the memory also storing an amount of program code that, when executed causes the processor to:
receive a license plate recognition (LPR) information query including an indication of the physical location and a target license plate number associated with the person of interest; and
determine the plurality of license plate recognition (LPR) instances within the search area of the physical location in response to receiving the LPR information query.

12. The apparatus of claim 11,
wherein the determining the at least one attribute of each of the plurality of clusters is based on at least one search metric.

13. The apparatus of claim 10, wherein an LPR instance of the plurality of LPR instances includes an indication of a vehicle license plate number, an indication of a physical location, and an indication of a time when the LPR instance was captured by an LPR system.

14. The apparatus of claim 11, wherein a license plate number associated with each of the plurality of LPR instances matches the target license plate number associated with the person of interest.

15. The apparatus of claim 10, wherein the determining of the relative likelihood of locating a person of interest at the physical location involves scaling a value of a cluster based on an amount of time since the last LPR site visit to the physical location.

16. The apparatus of claim 10, wherein the determining of the relative likelihood of locating a person of interest at the physical location involves scaling a value of a cluster based on a number of LPR site visits to the physical location.

17. The apparatus of claim 10, the memory also storing an amount of program code that, when executed causes the processor to:
- determine a first license plate number within a first search zone and a first time window around a first LPR instance of a target license plate number;
- determine a second license plate number within a second search zone and a second time window around a second LPR instance of the target license plate number; and
- associate the first license plate number and the target license plate number if the first license plate number matches the second license plate number.

18. The apparatus of claim 17, wherein the first LPR instance comprises an indication of a first physical location of the target license plate number and an indication of a first time when an image of the target license plate number was captured, and wherein the second LPR instance comprises an indication of a second physical location of the target license plate number and an indication of a second time when an image of the target license plate number was captured.

\* \* \* \* \*